US006622911B1

(12) United States Patent
Holland-Letz et al.

(10) Patent No.: US 6,622,911 B1

(45) Date of Patent: Sep. 23, 2003

(54) BANKNOTE CONTAINER FOR AUTOMATED TELLER MACHINES

(75) Inventors: Günter Holland-Letz, Paderborn (DE); Gerd Oppenheimer, Borchen (DE); Ulrich Neumann, Lippstadt (DE)

(73) Assignee: Wincor Nixdorf GmbH & Co. KG, Paderborn (DE)

(*) Notice: Subject to any disclaimer, the term of this patent is extended or adjusted under 35 U.S.C. 154(b) by 0 days.

(21) Appl. No.: 09/830,203

(22) PCT Filed: Feb. 2, 2000

(86) PCT No.: PCT/DE00/00320

§ 371 (c)(1),
(2), (4) Date: Apr. 23, 2001

(30) Foreign Application Priority Data

Feb. 4, 1999 (DE) ........................................ 199 04 540

(51) Int. Cl.[7] .......................... G06F 17/60; G06F 7/08; B65H 1/00

(52) U.S. Cl. .............................. 235/379; 902/8; 902/13

(58) Field of Search ................................ 235/379, 475; 271/3, 145, 149, 157, 163, 207, 215, 223; 902/8, 13, 14; 221/2, 4, 6, 7, 198, 103

(56) References Cited

U.S. PATENT DOCUMENTS

| | | | | | |
|---|---|---|---|---|---|
| 4,017,004 | A | | 4/1977 | Onoe et al. | |
| 5,092,575 | A | | 3/1992 | Ramsey | |
| 5,100,022 | A | * | 3/1992 | Fukudome et al. | 221/198 |
| 5,211,389 | A | * | 5/1993 | Roch et al. | 271/207 |
| 6,135,440 | A | * | 10/2000 | Lynch et al. | 271/34 |
| 6,244,504 | B1 | * | 6/2001 | Holland-Letz | 232/15 |
| 6,427,998 | B1 | * | 8/2002 | Norrie et al. | 271/145 |

FOREIGN PATENT DOCUMENTS

| | | |
|---|---|---|
| DE | 38 31 658 A1 | 3/1989 |
| DE | 36 50 424 T2 | 6/1996 |
| EP | 0 600 848 A2 | 6/1994 |

* cited by examiner

*Primary Examiner*—Karl D. Frech
*Assistant Examiner*—April Nowlin
(74) *Attorney, Agent, or Firm*—McCormick, Paulding & Huber LLP

(57) ABSTRACT

A banknote container for automated teller machines includes a base, two mutually parallel side walls, rear wall, front wall, cover and pressure-exerting slide, arranged in the bottom container part such that it can be adjusted parallel to the side walls. Arranged on the pressure-exerting slide is a switch for controlling a display device. The switching element interacts with a switch-actuating track provided on the container base, extends parallel to the adjustment direction of the pressure-exerting slide and defines a switching point between two switching states which corresponds to a remaining-quantity-signaling position of the pressure-exerting slide, one switching state corresponding to the adjustment path of the pressure-exerting slide between the remaining-quantity-signaling position and an end position near the rear wall, and the other switching state corresponding to the adjustment path of the pressure-exerting slide between the remaining-quantity-signaling position and an end position in the vicinity of the front wall.

13 Claims, 2 Drawing Sheets

BANKNOTE CONTAINER FOR AUTOMATED TELLER MACHINES

BACKGROUND OF THE INVENTION

The invention relates to a banknote container for automated teller machines according to the preamble of claim 1. A banknote container of the type mentioned is known from DE 36 50 424 T2.

In order that automated teller machines do not have to shut down on account of a lack of money, it has to be possible to monitor the filling level of the cash boxes. Generally, the application software of the automated teller machine keeps a check on the supply of banknotes. For this purpose, it is necessary to input the initial filling quantities of the cash boxes or banknote containers, from which the money paid out is subtracted.

In many cases, the filling quantities are not input. On the other hand, however, it is intended to ensure that the automated teller machine is capable of operating, in particular at weekends. DE 36 50 424 T2 proposes a rod which is mounted in the banknote container and is displaced by a resilient tongue on the pressure-exerting slide when the signaling position is reached, with the result that a contact which is arranged in front of the banknote container, and outside the same, is closed. It is possible to adjust a stop on the rod for different remaining-quantity presettings. However, the contact is not maintained until the banknote container is fully emptied since the signal disappears again when, upon further advancement of the pressure-exerting slide, the resilient tongue slides over the stop on the rod. Moreover, it is possible for the electrical storage of the signal to be lost when operation is interrupted, for example by the banknote container being drawn out of the automated teller machine.

It is known from DE 38 31 658 A1 to arrange a reed switch in front of the front wall of the banknote container and outside said container, while, in the bank note container, a permanent magnet is fastened on the pressure-exerting slide in order to actuate the reed switch when the pressure-exerting slide approaches the front wall. The disadvantage with this solution is the imprecise signal as a result of the different magnetic field strength of the permanent magnets and the different response sensitivity of the reed contact, the short range, which only allows a small remaining quantity, and the inability to adjust to different remaining quantities for which the signal is to be given.

SUMMARY OF THE INVENTION

The object of the invention is to design a banknote container of the type specified in the preamble of claim 1 such that, even with relatively large quantities remaining, a reliable and precise signal can be given and, even with continued operation of the bank note container, this signal is maintained until the container is refilled again.

The object is achieved according to the invention by the features specified in the characterizing part of claim 1.

In the solution according to the invention, the switching element is in contact with the switch-actuating track over the entire displacement path of the pressure-exerting slide. At the switching point, which is formed for example by a step in the switch-actuating track, the switching state of the switch changes, with the result that, at this point, a signal can be displayed on the display device. Since the changed switching state is maintained until even the last banknote has been withdrawn and the pressure-exerting slide has reached its end position in the vicinity of the front wall, the signal is maintained irrespective of the position of the pressure-exerting slide, to be precise even when operation is interrupted, for example by the box being drawn out of the automated teller machine. Furthermore, the solution according to the invention can also be used if relatively large quantities remain.

The switch is preferably a microswitch with a pivoting lever forming the switching element, it being possible for said lever to bear a roller which butts against the switch-actuating track. It is also possible, however, for the switch to be formed by a fork-type light barrier, of which the light path can be interrupted by the adjustable switching element. In a further embodiment, the switch is formed by a Hall-effect sensor which is assigned a permanent magnet arranged on the adjustable switching element.

In order for it to be possible to adjust, in accordance with the requirements in each case, the remaining quantity for which a signal is to be given, it is expedient if it is possible to adjust the switching point along the switch-actuating track. The switch is preferably arranged on the pressure-exerting slide and has a switching element which can be deflected perpendicularly to the banknote container, the switch-actuating track being provided on the banknote container and having two track sections at different distances from the pressure-exerting slide. In order to prevent the switching element from catching on the step between the two track sections, the latter are expediently connected to one another by a switching ramp.

In order to make adjustment of the switching point possible in the abovementioned embodiment, the invention proposes that a groove is formed in the container base, in the path of the switching element, and its base forms a first track section, and that guided in the groove is a slide which partially covers said groove and of which the top side forms at least part of the second track section. In this solution, on the one hand, the planar base on which the banknotes can be displaced in a state in which they stand on edge is maintained. On the other hand, said solution gives the two track sections of the switch-actuating track which are separated from one another by a step, it being possible for the step to be displaced in the longitudinal direction of the switch-actuating track.

Neither a gap nor a step which influences the switching state of the switch must be produced between the slide and the track section adjoining the same in the direction of the rear wall of the container. This can be achieved in that the slide—as seen in cross section—has a hat profile and is guided on a rib which extends into the groove and continues the track section adjoining the rear wall of the container. This guidance allows the slide to be designed with a very thin top side, with the result that the resulting step, which cannot be avoided altogether, is still within the tolerance range of the switching path of the switching element.

The slide can expediently be latched in different positions, it being possible to assign said latching positions a measuring scale which is arranged on the container base, with the result that an operator can move the slide into a latching position corresponding to a certain remaining quantity.

The pressure-exerting slide is expediently adjusted by an actuating drive with an electric motor which is arranged on the pressure-exerting slide and drives gearwheels which are mounted on said slide and by means of which the pressure-exerting slide is guided on racks which extend parallel to the side walls of the container.

The actuating drive can be controlled in that a pressure-exerting plate, which forms the pressure-exerting surface, is mounted on a frame part of the pressure-exerting slide such that it can be pivoted about a pin parallel to the front wall and the container base, and it is prestressed away from the frame part, and in that arranged on the pressure-exerting slide is a switch which controls the actuating drive and can be actuated by a pivoting movement of the pressure-exerting plate. If, when the pressure-exerting slide moves in the direction of the banknote stack, the pressure-exerting plate approaches the frame part because the banknote stack cannot be displaced any further, then this actuates the switch and switches off the actuating drive. If the banknote stack can be displaced again by banknotes being withdrawn, then the pressure-exerting plate is relieved of loading and moves away from the frame part. As a result, the switch is actuated again and the actuating drive is switched on again.

BRIEF DESCRIPTION OF THE DRAWINGS

The following description explains the invention with reference to an exemplary embodiment in conjunction with the attached drawings, in which:

Figure 1:
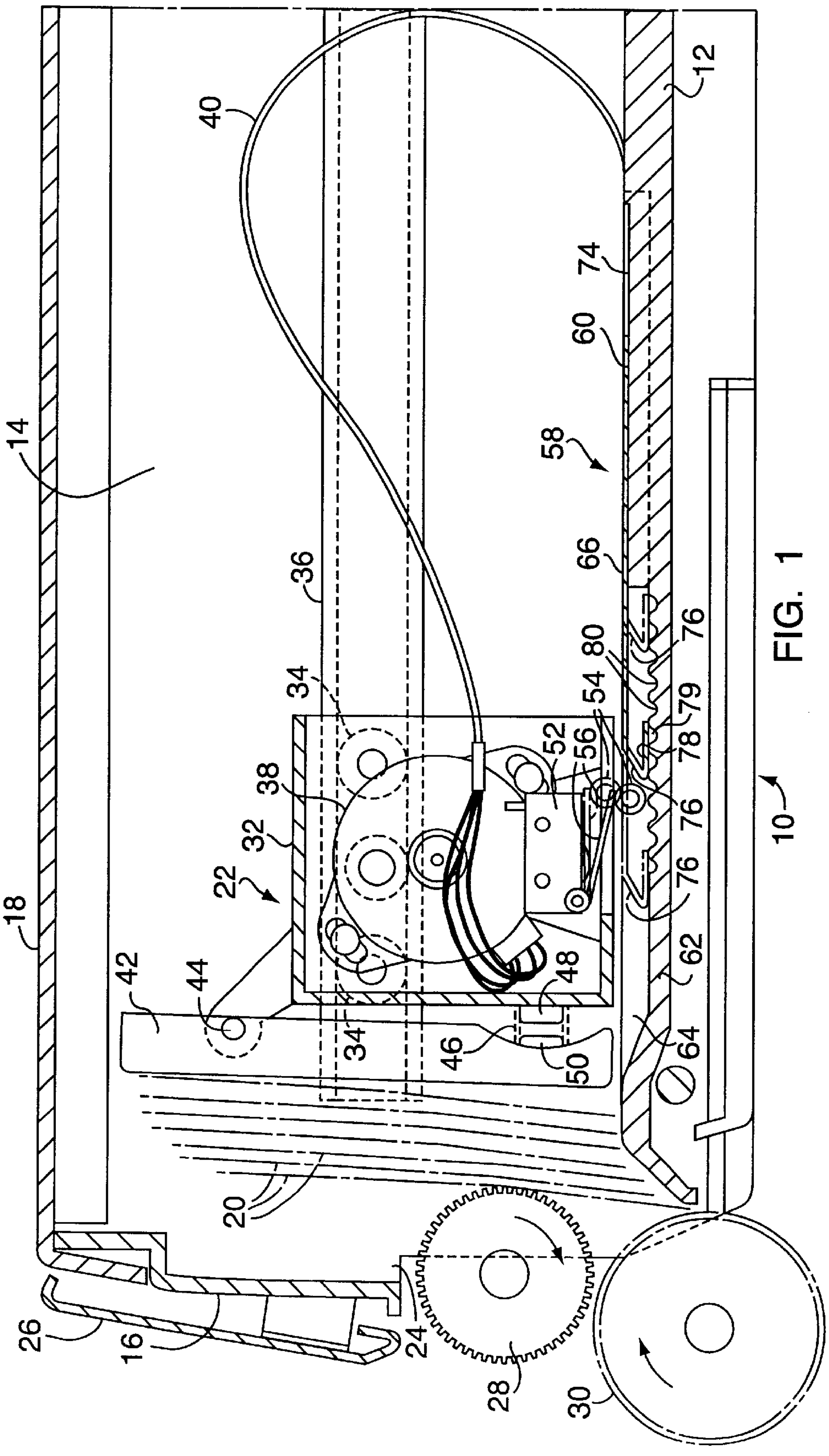
Figure 3:
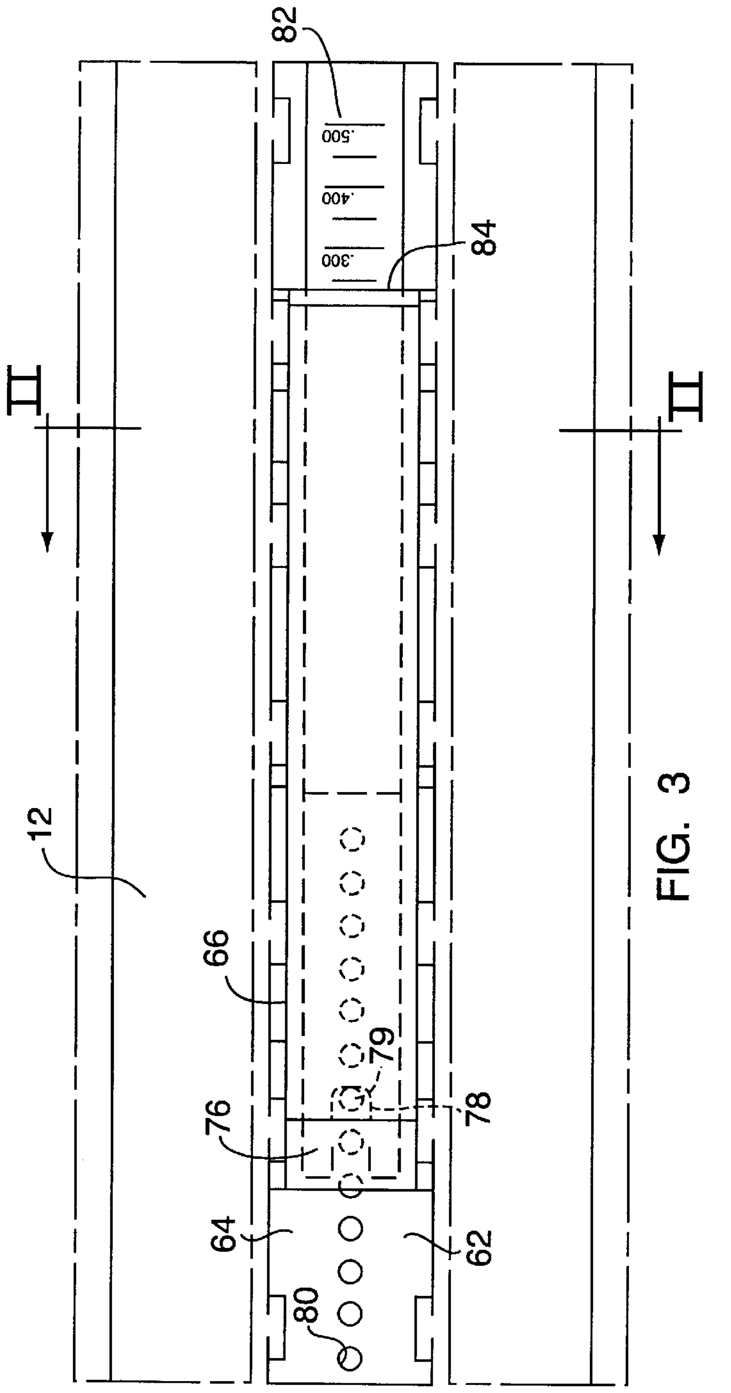
Figure 2:
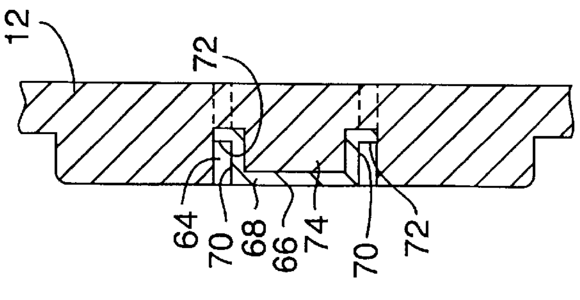

| | |
|---|---|
| FIG. 1 | shows a schematic longitudinal section through the front section of a banknote container according to the invention, the longitudinal section being taken parallel to the side walls of said banknote container, |
| FIG. 2 | shows a cross section through the container base in the region of the switch-actuating track along line II-II in FIG. 3, and |
| FIG. 3 | shows a schematic plan view of part of the container base with a section of the switch-actuating track. |

DETAILED DESCRIPTION OF THE PREFERRED EMBODIMENT

The banknote container illustrated in FIG. 1 comprises a bottom container part 10 with a container base 12, side walls 14, of which only one is illustrated in FIG. 1, a front wall 16 and a rear wall, which is arranged at the opposite end of the bottom container part 10 and is not illustrated in FIG. 1. The bottom container part 10 is closed by a cover 18.

The container, serves for accommodating a stack of banknotes 20 which stand on edge on the container base 12 and are pushed in the direction of the front wall 16 by a pressure-exerting slide designated in general terms by 22. Formed in the front wall 16 is an opening 24 which can be closed by a swing-action screen 26 and serves for the engagement of the withdrawing rollers 28, 30 of a separating device of the automated teller machine when the banknote container has been pushed into the same. The banknote container described thus far is known per se and thus need not be explained.

The pressure-exerting slide 22 comprises a frame part 32 which is mounted, via gearwheels 34, on racks 36 which are arranged along the side walls 14 of the bottom container part 10. The gearwheels 34 are driven by a stepping motor 38 which is connected, via a trailing cable 40, to a control means and power supply (not illustrated).

A pressure-exerting plate 42 is mounted on the frame part 32 such that it can be pivoted about a pin 44 parallel to the front wall 16 and the container base 12. The pressure-exerting plate 42 is kept at a distance from the frame part 32 by a spring 46. Provided on the frame part 32 and the pressure-exerting plate 42 are switching contacts 48, 50 which are assigned to one another and, in the case of contact, actuate a switch which brings the stepping motor 38 to a standstill. This switch controls the movement of the pressure-exerting slide 22.

Also arranged on the frame part 32 is a microswitch 52, of which the switching lever 56, which is provided with a roller 54, can be adjusted between a position represented by solid lines and a position represented by chain-dotted lines. The roller of the switching lever 54 interacts with a switch-actuating track which is designated in general terms by 58, extends parallel to the movement direction of the pressure-exerting slide 22 and has a first track section 60, which is aligned with the top side of the base, and a second track section 62, which is lower than the first track section and is formed by the base of a channel or groove 64.

The length of the track sections 60 and 62 can be adjusted. For this purpose, use is made of a slide 66 which, according to FIG. 2, has a hat profile with a longitudinal web 68 and two legs 70 which are perpendicular to said longitudinal web and are adjoined, in turn, by webs 72 which are bent outward at right angles. The slide 66 is guided on a rib 74 which extends into the groove 64 over part of the same and of which the height is dimensioned such that the surface of the slide 66 is aligned with the inner surface of the container base 12, as can be seen in FIGS. 1 and 2. At its free end, the slide has an oblique surface 76 which serves as a switching ramp. A latching protrusion 79 is formed on a resilient tongue 78 which belongs to the slide and adjoins the oblique surface 76 in the rearward direction, it being possible for said latching protrusion to engage in latching depressions 80 which are formed in the base of the groove 64. It is thus possible for the slide 66 to be displaced on the guide rib 74, as is indicated in FIG. 1 by the different positions represented by solid lines or chain-dotted lines.

The switch 52 is connected to a display device (not illustrated). The oblique surface 76 on the slide 66 defines a switching point at which the switching lever 56 transfers from the position represented by chain-dotted lines in FIG. 1 to the position represented by solid lines in FIG. 1 when the pressure-exerting slide 22 moves in the direction of the front wall 16. Since said switching point corresponds to a certain position of the pressure-exerting slide 22 within the container, it is possible to display, as a result of said switch actuation, the quantity of banknotes still remaining between the front wall 16 and the pressure-exerting plate 42 of the pressure-exerting slide 22. By virtue of the slide 66 being displaced, it is possible for the switching point to be shifted in the forward or rearward direction and thus for the remaining quantity for which a signal appears on the display device to be determined. In order to facilitate the adjustment of the desired remaining quantity, in the embodiment illustrated, a measuring scale 82 is applied to the top side of the guide rib 74, said measuring scale interacting with the trailing edge 84 of the slide 66.

As can be seen in FIG. 1, the track section 60 of the switch-actuating track 58 likewise has a slight depression following the trailing edge 84 of the slide 66. However, the thickness of the web 68 of the slide 66, and thus the depression, is sufficiently small for a resulting movement of the switching lever 56 on the switch 52 not to result in actuation of the same.

The conventional banknote containers usually have, on their outside, a connector which comes into contact with a mating connector of the automated teller machine when the banknote container is pushed into the automated teller machine. It is also possible for the connection of the switch 52 to the display device to be routed via said connector, with the result that the banknote box according to the invention can also be pushed into conventional automated banking machines.

What is claimed is:

1. A banknote container for automated teller machines, comprising an essentially cuboidal bottom container part (10) which is intended for accommodating banknotes and has a base (12), two mutually parallel side walls (14), a rear wall and a front wall (16), which has a closable opening (24) for the withdrawal of individual banknotes (20) by means of a separating device (28, 30) of the automated teller machine, and also comprising a cover (18), which can be locked to the bottom container part (10), and a pressure-exerting slide (22), which has a pressure-exerting surface (42) which is essentially parallel to the front wall (16), is arranged in the bottom container part (10) such that the pressure-exerting surface can be adjusted parallel to the side walls (14), and interacts with a switch (52) to control a display device, characterized in that the switch (52) is arranged on the pressure-exerting slide (22) and has a switching element (56) which can be deflected perpendicularly to the container base (12) and interacts with a switch-actuating track (58) which is formed on the container base (12), extends parallel to the adjustment direction of the pressure-exerting slide (22) and defines a switching point between two switching states which corresponds to a remaining-quantity-signaling position of the pressure-exerting slide (22), one switching state corresponding to the adjustment path of the pressure-exerting slide (22) between the remaining-quantity-signaling position and an end position in the vicinity of the rear wall, and the other switching state corresponding to the adjustment path of the pressure-exerting slide (22) between the remaining-quantity-signaling position and an end position in the vicinity of the front wall (16).

2. The banknote container as claimed in claim 1, characterized in that it is possible to adjust the switching point along the switch-actuating track (58).

3. The banknote container as claimed in claim 1, characterized in that the switch-actuating track (58) has two track sections (60, 62) at different distances from the pressure-exerting slide (22).

4. The banknote container as claimed in claim 3, characterized in that the two track sections (60, 62) are connected by a switching ramp (76).

5. The banknote container as claimed in claim 3, characterized in that a groove (64) is formed in the container base (12), in the path of the switching element (56), and the container base forms a first track section (62), and in that guided in an adjustable manner in the groove (64) is a slide (66) which partially covers said groove and of which the top side (68) forms at least part of the second track section (60).

6. The banknote container as claimed in claim 5, characterized in that the slide (66) has a hat profile and is guided on a rib (74) which extends into the groove (64).

7. The banknote container as claimed in claim 5, characterized in that the slide (66) can be latched in different positions.

8. The banknote container as claimed in claim 5, characterized in that the slide (66) is assigned a measuring scale (82) which is arranged on the banknote container (12).

9. The banknote container as claimed in claim 1, characterized in that the switch (52) is a microswitch with a pivoting lever (56) forming the switching element.

10. The banknote container as claimed in claim 1, characterized in that the switch is a light barrier, of which the light path can be interrupted by the adjustable switching element.

11. The banknote container as claimed in claim 1, characterized in that the switch is formed by a Hall-effect sensor which is assigned a permanent magnet arranged on the adjustable switching element.

12. The banknote container as claimed in claim 1, characterized in that the pressure-exerting slide (22) bears an electric motor (38) which drives gearwheels (34) which are mounted on the pressure-exerting slide (22) and by means of which the pressure-exerting slide (22) is guided on racks (36) which extend parallel to the side walls (14).

13. The banknote container as claimed in claim 1, characterized in that a pressure-exerting plate (42), which forms the pressure-exerting surface, is mounted on a frame part (32) of the pressure-exerting slide (22) such that the pressure-exerting plate can be pivoted about a pin (44) parallel to the front wall (16) and the container base (12), and the pressure-exerting plate is prestressed away from the frame part (32), and in that arranged on the pressure-exerting slide (22) is a switch which controls the actuating drive and can be actuated by a pivoting movement of the pressure-exerting plate (42).

* * * * *